United States Patent [19]
Bottacini

[11] Patent Number: 5,356,111
[45] Date of Patent: Oct. 18, 1994

[54] MINIATURIZED SOLENOID VALVE DEVICE AND METHOD FOR MANUFACTURING SAID DEVICE

[75] Inventor: Roberto Bottacini, Lurano, Italy

[73] Assignee: Pneumax S.r.l., Lurano, Italy

[21] Appl. No.: 67,437

[22] Filed: May 24, 1993

[30] Foreign Application Priority Data

Jun. 8, 1992 [IT] Italy .................... MI92A001414

[51] Int. Cl.⁵ .................... F16K 31/02; F15B 13/044
[52] U.S. Cl. .................... 251/129.15; 137/625.65
[58] Field of Search ............... 137/625.65; 251/129.15

[56] References Cited

U.S. PATENT DOCUMENTS

| | | | |
|---|---|---|---|
| 4,403,765 | 9/1983 | Fisher ...................... | 137/625.65 X |
| 4,509,716 | 4/1985 | Barber et al. ............. | 251/129.15 |
| 4,552,179 | 11/1985 | Tarusawa et al. ........ | 137/625.65 |
| 4,643,393 | 2/1987 | Kosugi et al. ............ | 251/129.15 X |
| 4,739,966 | 4/1988 | Lepine et al. ............ | 251/129.15 |
| 4,913,399 | 4/1990 | Migliori .................... | 137/625.65 |

FOREIGN PATENT DOCUMENTS 62-4979  1/1987  Japan .................... 137/625.65

*Primary Examiner*—Gerald A. Michalsky
*Attorney, Agent, or Firm*—Wolf, Greenfield & Sacks

[57] ABSTRACT

Miniaturized solenoid valve device including: a valve housing member containing a valve port and flow passages connected to the port; a valve body moving to engage or free the port in order to control the connection between the port and the passages; a solenoid arranged adjacent to the housing member in order to move the valve body; a removable pusher to push the solenoid against the housing member; the solenoid is provided with a polymeric covering which forms an abutment for connection to the housing member.

3 Claims, 3 Drawing Sheets

MINIATURIZED SOLENOID VALVE DEVICE AND METHOD FOR MANUFACTURING SAID DEVICE

FIELD OF THE INVENTION

The present invention relates to a miniaturized solenoid valve device and to a method for manufacturing said device.

Particularly the field of the present invention relates to valves having a valve housing member which contains a valve port and flow passages connected to the port. A valve body called also plunger can move to engage or free the port in order to control the connection between the port and the passages. A solenoid is arranged adjacent the valve housing member in order to move the valve body. The valve body generally closes the port by means of the action of a spring. During the action, the magnetic field generates a force which is stronger than the force of the spring, so the valve body moves backwards and opens the port. A removable pusher means pushes the solenoid against the valve housing member.

More particularly, but not exclusively, the field of the present invention relates to valve devices suitable to be connected mutually side by side to a distribution block. The high miniaturization required, in order to arrange many devices mutually adjacent in a small space, causes the magnetic forces involved in controlling the movement of the movable valve body to be very small. So only small springs can be used, which generate only a small closing force of the port and therefore only small valve ports can be used. In order to ensure reliable operation, it becomes necessary to reduce power losses, in order to be able to open and close the largest possible valve port, for a given valve size. For example, for a valve with a front width of 10 cm the maximum size of the valve port is considered to be approximately 0.4 mm.

DESCRIPTION OF THE PRIOR ART

French patent applications 2 603 970 and 2 643 970, Swiss patent CH 650 320 and German patent application 25 40 751 relate to valves in which the valve housing member is connected with the solenoid by means of a rigid joint which cannot be disassembled.

However it must be possible to disassemble these devices for cleaning the inside of the valve, separating the solenoid from the valve housing member. The coupling between the solenoid and the housing member is therefore critical; one should consider, for example, that a play of one tenth of a millimeter in this coupling may give a 30% power loss.

These devices can be used as direct-drive valves or as drivers for large-size valves in two- or three-way functions.

Devices of this type are known; for example, European patent no. 139811 discloses a miniaturized solenoid valve wherein the solenoid can be removed from the valve housing member. However, these known devices are not free from problems, because the coupling of the solenoid with the valve housing member makes the placement uncertain, especially after the valve has been opened and closed a few times for cleaning. The plastic seats of the closure elements of the coupling in fact tend to deform and generate play.

The devices disclosed in U.S. Pat. Nos. 4,102,526 and 4,643,393 show an even lower coupling precision, because the closure element cannot produce any thrust of the solenoid against the valve housing member. Furthermore many distinct pieces are required, each of them can involve a distinct coupling error and certainly involves additional manufacturing and assembling time and costs.

U.S. Pat. Nos. 2,699,915 and 4,238,110 and French patent 1.379.771 disclose non-miniaturized solenoid valves, and the coupling precision is lower than in the other above mentioned cases.

EP-A-0 336 226 teaches the use of a metallic guide tube for separating the magnetic circuit from the plunger. This metallic tube increases the distance between magnetic circuit and plunger and therefore gives rise to a decrease of the magnetic yield. Furthermore it requires an additional body made by pressure casting to support the metallic tube and the manual press-button. So the high number of pieces, comprising the metallic tube and the additional body involves a high industrial cost. The pneumatic seal is achieved by means of a mechanical seaming of the metallic tube. However according to this teaching it is impossible to carry out small bistable valves for example large 10 mm. The pneumatic seal between the valve and the distribution block requires a single elastic gasket and requires also the drilling of three distinct very small holes into the distribution block for each valve.

Furthermore, generally, in known devices the magnetic field generates a radial thrust on the movable valve body, causing a decrease in the efficiency of the exploitation of the magnetic force and an increase in the friction of the movable valve body against its seat during motion. A so-called guiding tube is generally used as seat for the movable valve body, but said tube increases the distance between the movable valve body and the magnetic circuit and thus decreases efficiency.

Finally, all known miniaturized valves of the type with an inlet, a first outlet for the actuation element and a second outlet for discharging into the atmosphere the residual pressure left in the actuation element require the provision, on the distribution block, of a groove at the second outlet for connection to the atmosphere. In view of the extremely small size of the holes on the distribution block, it is evident that the provision of said groove on the steel block is a delicate operation which must be performed with utmost precision and therefore entails a considerable additional burden during installation.

SUMMARY OF THE INVENTION

The aim of the present invention is therefore to overcome the above problems.

An object of the invention is to increase the width of the valve port for an equal size of the device and with extremely low electric power levels, for example on the order of one watt.

Another object of the invention is to allow to further reduce the size of the device and in particular the front width, which is critical for fitting the greatest number of contiguous devices on a block having a given length.

Another object of the invention is to provide a valve device which can be used with any type of fluid, whether liquid or gaseous.

Another object of the invention is to provide a device capable of operating with high-speed actuation circuits, including electronic ones.

According to a first aspect, the present invention provides a miniaturized solenoid valve device comprising: a valve housing member containing a valve port and flow passages connected to said port; a valve body moving to engage or free said port to control the connection between said port and said passages; a solenoid arranged adjacent to said housing member in order to move said valve body; removable pusher means to push said solenoid against said housing member; said solenoid comprising a polymeric covering forming an abutment for connection to said housing member; said pusher means comprising:

a) an upper part provided with a central opening, at least a portion of the edge of said opening being provided with a recess for engaging said solenoid;

b) two opposite lateral parts each provided with an indent toward its lower end to engage said housing member.

It is thus possible to increase the thrusting force of the solenoid against the valve housing member and make it more reliable in the course of time, allowing to reduce tolerances to extremely low values. Disassembly is furthermore simplified and does not require particular tools, a conventional screwdriver being sufficient. This is achieved preferably by forming the pusher means with a folded steel sheet.

According to a further aspect, the present invention provides a miniaturized solenoid valve device comprising: a valve housing member containing a valve port and flow passages connected to said port; a valve body moving to engage or free said port to control the connection between said port and said passages; a solenoid arranged adjacent to said housing member in order to move said valve body; removable pusher means to push said solenoid against said housing member; said solenoid comprising:

a) an element made of a material with high magnetic permeability arranged between a winding of said solenoid and said housing member;

b) a polymeric covering which forms an abutment for connection to said housing member;

said element having the function of guiding an axial movement of said valve body in order to reduce a radial thrust generated on said valve body by a magnetic field of said solenoid.

In this manner, the magnetic field is substantially used only to generate a useful axial thrust, thus increasing the efficiency and at the same time reducing the friction of the movable valve body against its seat. It also becomes possible to eliminate the use of the so-called guiding tube, thus decreasing the distance between the movable valve body and the magnetic circuit and consequently increasing efficiency. This is preferably achieved with a coupling between said valve body and said element whose play is very limited substantially smaller than a play between said valve body and a material with low magnetic permeability which internally lines said winding.

More preferably, the length of said element, measured in the direction of the axial movement of said valve body, is greater than $\frac{1}{3}$ of the length of said valve body and is preferably greater than 1/2.5 of the length of said valve body.

According to a third aspect, the present invention provides a miniaturized solenoid valve device which comprises: a valve housing member which contains a valve port and flow passages connected to said port; a valve body which can move to engage or free said port in order to control the connection between said port and said passages; a solenoid arranged adjacent to said housing member in order to move said valve body; removable pusher means to push said solenoid against said housing member; a manual pushbutton arranged in said housing member in order to raise said valve body and open said valve port; said solenoid comprising a polymeric covering which forms an abutment for connection to said housing member; said pushbutton being engaged and kept in its seat by said external polymeric covering of said solenoid.

In this manner it is possible to have a manual pushbutton for the actuation of the valve from outside without further complicating the construction of the valve housing member and particularly without requiring additional pieces to prevent the exit of the pushbutton under the action of the inner pressure.

According to a fourth aspect, the present invention provides a miniaturized solenoid valve device comprising: a valve housing member containing a valve port and flow passages connected to said port; a valve body moving to engage or free said port in order to control the connection between said port and said passages; a solenoid arranged adjacent to said housing member in order to move said valve body; removable pusher means to push said solenoid against said housing member; said passages comprising an inlet, a first outlet to connect said inlet to an actuation element and a second outlet to connect said first outlet to the atmosphere, in order to discharge said actuation element; said inlet, said first outlet and said second outlet being defined on a flat wall of said housing member for mounting on a corresponding flat wall of a block which is connected to a supply and to actuation elements; said second outlet comprising a groove defined on said flat wall of said housing member in order to discharge said second outlet into the atmosphere.

In this manner it is possible to permanently avoid the provision of venting grooves or holes on the distribution block which supports the devices according to the invention. This is preferably achieved by individually surrounding said inlet and said first outlet with a gasket of their own which is physically distinct and separate from the gasket of the respective other part.

According to a fifth aspect, the present invention provides a method for manufacturing a miniaturized solenoid valve device comprising: a valve housing member containing a valve port and flow passages connected to said port; a valve body moving to engage or free said port in order to control the connection between said port and said passages; a solenoid arranged adjacent to said housing member in order to move said valve body; removable pusher means to push said solenoid against said housing member; a duct which is defined inside a winding of said solenoid and internally lined with a material having low magnetic permeability; said solenoid comprising a polymeric covering forming an abutment for connection to said housing member; said method comprising inserting a permanent magnet inside said duct prior to an application of said external polymeric covering on said winding; said permanent magnet being fixed below a member made of material with high magnetic permeability, said member having a top which is wider than said duct, so that said application rigidly fixes said permanent magnet inside said duct.

This process allows to provide a bistable miniaturized valve, wherein the permanent magnet can retain the movable valve body in a raised position, leaving the valve open even when the solenoid is not energized. In order to close the valve it is sufficient to reverse the polarity of the solenoid.

BRIEF DESCRIPTION OF THE DRAWINGS

The present invention is described in detail with reference to the accompanying drawings, which exemplify but do not limit the inventive concept, and wherein.

DESCRIPTION OF THE PREFERRED EMBODIMENTS OF THE INVENTION.

Figure 1:
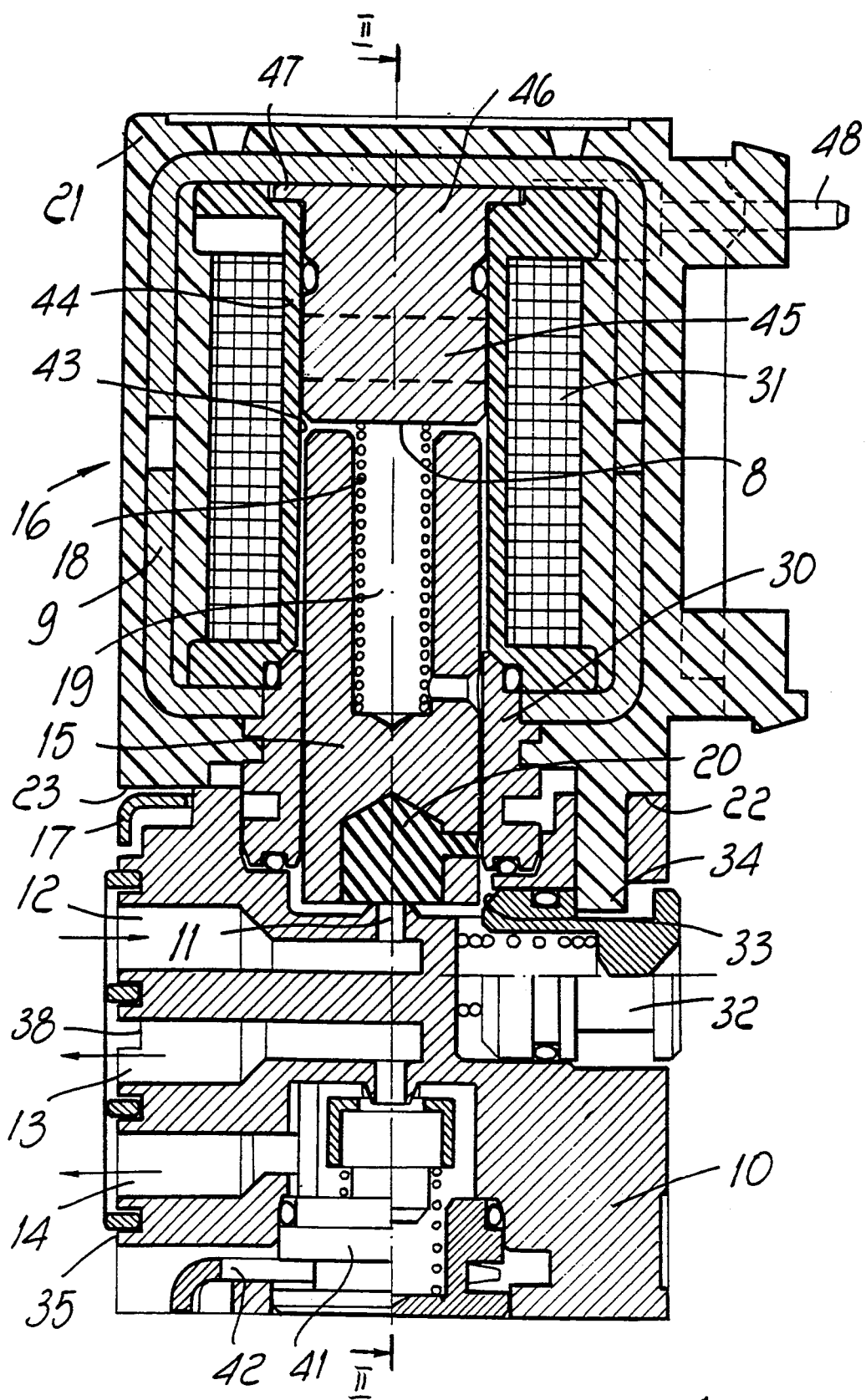
FIG. 1 is a sectional side view of the device according to the invention.
Figures 2, 3:
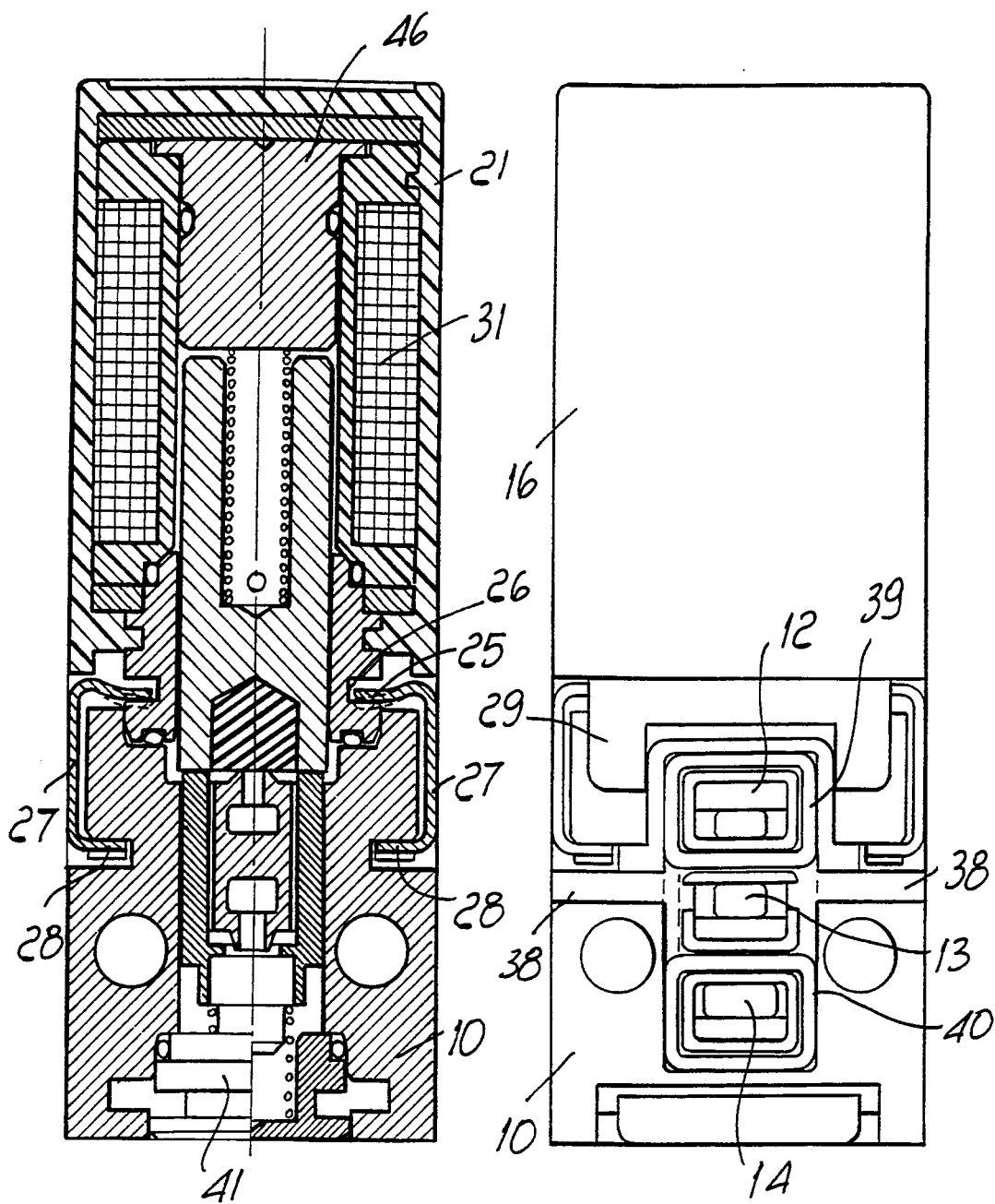
FIG. 2 is a sectional front view, taken along the plane II—II of FIG. 1.
FIG. 3 is a front view of the device of FIG. 1.
Figure 4:
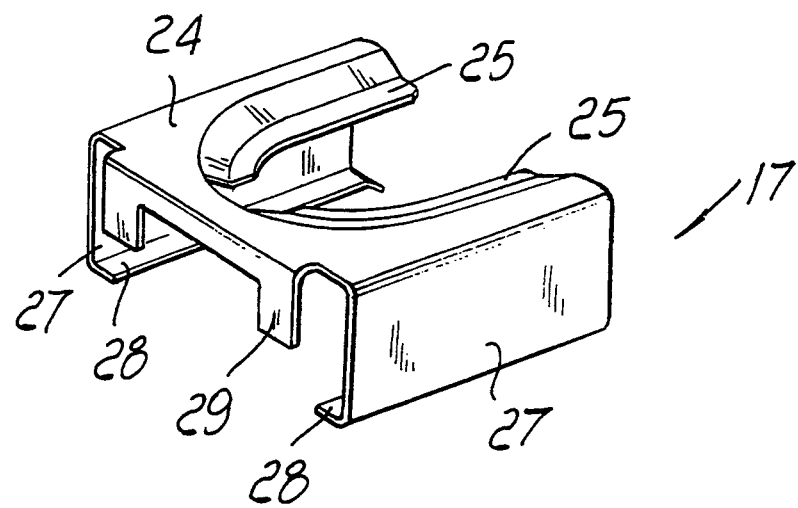
FIG. 4 is a perspective view of a detail of FIG. 1.
Figure 5:
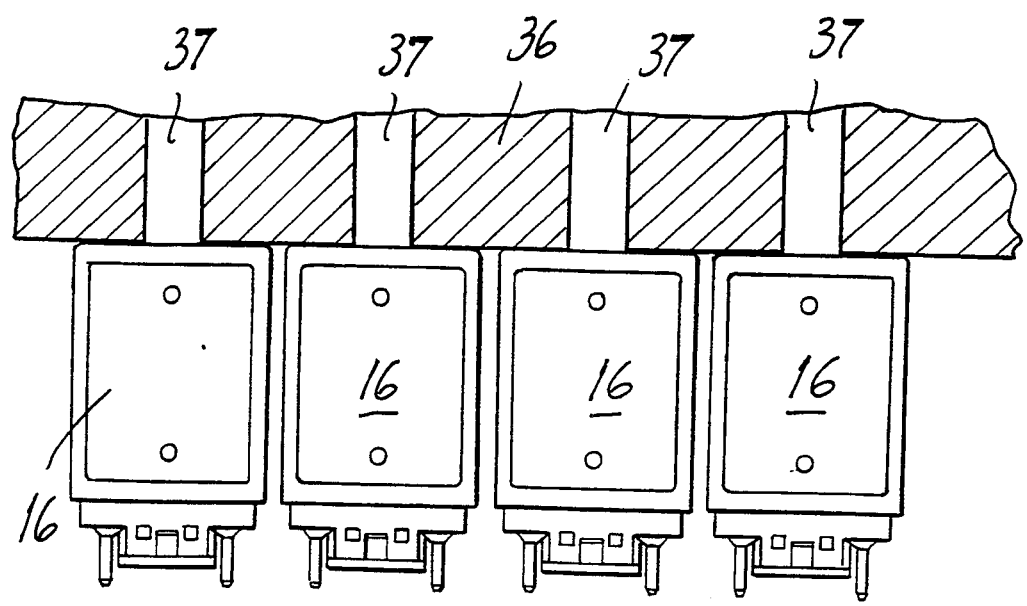
FIG. 5 is a partially sectional plan view of a plurality of devices according to FIG. 1.

With reference to FIGS. 1 to 5, the miniaturized solenoid valve according to the invention comprises: a valve housing member 10 made of thermoplastic polymeric material, which contains a valve port 11 and flow passages 12, 13 and 14 connected to the port 11. The thermoplastic polymer which forms the housing member 10 can be chosen of a kind which is compatible with the fluid which must flow in the valve, so that even aggressive or biological fluids can be used.

A movable valve body 15 is made of a material with high magnetic permeability. The term "material with high magnetic permeability" refers to iron, nickel or cobalt or alloys thereof. Normally, when the solenoid 16 is not energized, the body 15 engages the opening 11 and disengages it when the solenoid 16 is energized. In this manner the connection between the opening 11 and the passages 12, 13 and 14 is controlled.

The solenoid 16 is arranged adjacent to the housing member 10 and can move the valve body 15 by overcoming the resistance of the spring 18 which is arranged in a dead axial cavity 19 of the valve body 15. The spring 18 generates the force for closing the port 11 by means of the rubber shutter 20. Larger ports 11 require stronger springs 18 in order to close them reliably. In any case, the magnetic field generated by the solenoid 16 must be able to overcome the force of the spring 18. The solenoid 16 comprises a thermoplastic polymeric covering 21. The lower ends 22 and 23 of the covering 21 form an abutment for connection to the housing member 10. In particular, the distance between the lower end 8 of the member 46 and the lower ends 22 and 23 of the thermoplastic covering 21 is preset by the molding of the thermoplastic covering 21 and is not subject to machining. Therefore this distance can be preset with an extremely precise tolerance.

The removable pusher means 17 pushes the solenoid 16 against the housing member 10; in particular, pusher means 17 is constituted by a folded steel sheet including an upper part 24 provided with a central opening. The central opening has an edge provided with a recess 25 for engaging a groove 26 formed on the solenoid 16. The pusher means 17 also comprises two opposite side walls 27 each provided with an indent 28 toward the lower end, in order to engage a groove defined on the housing member 10. The pusher means 17 furthermore comprises a folded rear tab 29 to facilitate the extraction of the pusher means 17.

The solenoid 16 comprises an element 30 made of a material with high magnetic permeability and arranged between a winding 31 of the solenoid 16 and the housing member 10. The element 30 can be termed the pole of the winding 31.

A skirt 9 made of a material with high magnetic permeability surrounds the winding 31 and conveys the magnetic flux toward the pole 30.

A pushbutton 32 is arranged in the housing member 10 in order to raise the valve body 15, by means of the inclined edge 33, for opening the valve port 11. The pushbutton 32 is engaged and kept in its seat by an extension 34 of the external polymeric covering 21 of the solenoid 16.

The passages 12, 13 and 14 comprise in particular an inlet 12, a first outlet 14 for connecting the inlet 12 to an actuation element which is not illustrated and a second outlet 13 for discharging the first outlet 14 and thus the actuation element into the atmosphere. The inlet 12, the first outlet 14 and the second outlet 13 are defined on a flat wall 35 of the housing member 10 so as to allow fitting on a corresponding flat wall of a distribution block 36 which is connected, by means of the passages 37, to a supply and to actuation elements. The second outlet 13 comprises a groove 38 defined on the flat wall 35 of the housing member 10 in order to discharge into the atmosphere the second outlet 13. Both the inlet 12 and the first outlet 14 are individually surrounded by a gasket of their own, respectively 39 and 40, which is physically distinct and separate from the gasket of the respective other part. In the alternative case in which the block 36 has a passage port for the discharge duct 13 as well, the gaskets 39 and 40 may be connected by the gasket indicated in broken lines.

The lower plug 41 is fitted in its seat with a locking clip 42.

A duct 43 defined inside the winding 31 of the solenoid 16 is internally lined with a material 44 which has low magnetic permeability.

The permanent magnet 45, indicated in broken lines, is used only if one wishes to provide a bistable valve. In this case, the permanent magnet 45 can be made of samarium-cobalt or of neodymium-iron-boron, and is fixed below the member 46, which is made of a material with high magnetic permeability and has a top 47 which is wider than the duct 43. The thermoplastic polymeric covering 21 perfectly locks both the member 46 and the permanent magnet 45, rigidly fixing the entire system. In this case, the device operates like a bistable valve and maintains memory of the last pulse received. The memory can be reset only by sending a signal with opposite polarity.

The parts with high magnetic permeability are preferably made of iron and are protected by nickel-plating, making them stainless.

The device according to the invention can be produced in all sizes, but it is also excellently suitable for particularly miniaturized executions in which the critical dimension of the front width is smaller than 10 mm.

The device is susceptible to numerous modifications and variations without abandoning the scope of the inventive concept; thus, for example, the pins may be replaced with protruding wires, operation can be indicated by light emitting indicators, only two ways may be provided instead of three as shown in the drawings. In particular, the two-way embodiment can be advantageously used in ink-jet systems which can fully exploit the easy cleaning afforded by the device according to the invention.

I claim:

1. Miniaturized solenoid valve device comprising: a valve housing member containing a valve port and flow passages connected to said port; a valve body moving to engage or free said port in order to control the connection between said port and said passages; a solenoid arranged adjacent to said housing member in order to move said valve body; a removable pusher means to push said solenoid against said housing member; said solenoid comprising a polymeric covering which forms an abutment for connection to said housing member; said pusher means comprising:
   a) an upper part provided with a central opening, at least a portion of the edge of said opening being provided with a recess for engaging said solenoid;
   b) two opposite lateral parts each provided with an indent toward its lower end for engaging said housing member.

2. Device according to claim 1, wherein said pusher means is constituted by a folded steel sheet.

3. Device according to claim 1, wherein said pusher means comprises a folded rear tab so as to facilitate the extraction of said pusher means.

* * * * *